United States Patent
Beskrovny et al.

(10) Patent No.: US 9,898,503 B2
(45) Date of Patent: Feb. 20, 2018

(54) FINDING SERVICES IN A SERVICE REGISTRY SYSTEM OF A SERVICE-ORIENTED ARCHITECTURE

(71) Applicant: International Business Machines Corporation, Armonk, NY (US)

(72) Inventors: Evgeny Beskrovny, Ramat Gan (IL); Omer Tripp, Har-Adar (IL); Emmanuel Wurth, Toulouse (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 837 days.

(21) Appl. No.: 13/920,162

(22) Filed: Jun. 18, 2013

(65) Prior Publication Data

US 2014/0012876 A1 Jan. 9, 2014

(30) Foreign Application Priority Data

Jul. 4, 2012 (GB) .................................. 1211872.5

(51) Int. Cl.
*G06F 17/30* (2006.01)
*H04L 29/08* (2006.01)
*G06F 9/46* (2006.01)

(52) U.S. Cl.
CPC .......... *G06F 17/30424* (2013.01); *G06F 9/46* (2013.01); *H04L 67/16* (2013.01)

(58) Field of Classification Search
CPC ...................... G06F 17/30592; G06F 17/30876
USPC .................. 707/770, 758, 769, 771
See application file for complete search history.

(56) References Cited

U.S. PATENT DOCUMENTS

| 7,814,142 | B2 * | 10/2010 | Mamou et al. | 709/203 |
| 7,966,320 | B2 | 6/2011 | Roshen | |
| 8,965,107 | B1 * | 2/2015 | Schpok | G06K 9/00201 382/154 |
| 2007/0061222 | A1 * | 3/2007 | Allocca et al. | 705/26 |
| 2010/0017405 | A1 * | 1/2010 | Roshen | 707/6 |
| 2010/0205237 | A1 * | 8/2010 | El-Nakhily | G06F 9/5055 709/203 |

(Continued)

FOREIGN PATENT DOCUMENTS

GB  2503696 A  1/2014

OTHER PUBLICATIONS

Richard Seroter; "New SOA Capabilities in BizTalk Server 2009: UDDI Services"; Apr. 2009; 13 pages.*

(Continued)

*Primary Examiner* — Monica Pyo
(74) *Attorney, Agent, or Firm* — Cuenot, Forsythe & Kim, LLC

(57) ABSTRACT

Searching a service registry system including a plurality of services identified by respective service names, wherein at least some of said service names being associated with a set of client identifiers, includes receiving a search request, said request including a service name and a further set of client identifiers, searching, using a processor, the service registry system for a match between the requested service name and a service name of one of said services in the service registry system, and, in the absence of such a match, searching, using the processor, the service registry system for services that have an association with at least some of the client identifiers in said further set. A search result can be returned.

16 Claims, 8 Drawing Sheets

(56) References Cited

U.S. PATENT DOCUMENTS

2012/0036252 A1\* 2/2012 Shi ..................... H04L 67/16
709/224
2012/0209903 A1\* 8/2012 Salt ..................... G06F 9/5055
709/203

OTHER PUBLICATIONS

Soudabeh Javadi; "IBM WebSphere Service Registry and Resposi-tory"; IBM On Demand Business; 35 pages; 2007.\*
UK Application No. 1211872.5, Examination Report, Oct. 29, 2012, 3 pg.

\* cited by examiner

FINDING SERVICES IN A SERVICE REGISTRY SYSTEM OF A SERVICE-ORIENTED ARCHITECTURE

CROSS-REFERENCE TO RELATED APPLICATIONS

This application claims the benefit of United Kingdom Application Number 1211872.5 filed on Jul. 4, 2012, which is fully incorporated herein by reference.

BACKGROUND

In computer programming, an ever increasing number of resources are becoming available on networks, e.g., local networks or the Internet. This is shifting the philosophy of software development from tightly coupled applications, in which different applications are capable of accessing each other to obtain required information, to more loosely coupled service-oriented architectures (SOAs) based on software components called services, which are typically designed to perform a specific (single) task and to be reused in many different (client) applications. In a SOA, a service is typically requested to produce a deliverable, e.g., the completion of a task, information, and so on, by requests or messages. Most services are typically designed to perform specific tasks upon request. A typical architecture is shown in FIG. 1. A service registry 100 acts as a directory of available services 120, which have registered with the service registry 100. A service consumer or client 140 can contact the service registry 100, either directly or via a proxy server (not shown), in order to locate services 120 that can be integrated in a business application of the client 140, such that the application can directly contact the service 120 and the service can directly deliver the requested service to the client 140.

Such a service-based approach to application design is extremely promising in terms of design flexibility, as a designer of a client application does not need to know how a particular (remote) service has been designed; it suffices to know how the service needs to be requested and what the service is capable of delivering. Service requests are typically formulated and handled using standardized message protocols, e.g., an XML-based protocol such as SOAP or JSON.

A particular challenge when designing or configuring an application that at least in part relies on services for its functionality is how to locate a service that can perform a desired task. In the conventional service registry system 100, to discover a service description 122 during development of a software system, a programmer of the software system needs to know a service name 121 in order to identify the service description 122. To this end, protocols such as WS-Discovery are available that allow a client to search for one or more target services over a (local) network, e.g. by accessing the service registry 100 in which the services are registered and provide the service registry 120 with a target system name 121. Such protocols may involve communicating with a central registry or issuing a multicast communication of a request for services to a group of services, in which the name of the requested service has to be specified. Services that match this name will respond to such communications, thereby informing the client of that a matching service is available on the network.

It will be immediately apparent that this requires the client to have a priori knowledge of the name of the desired service, which more often than not is not the case, such that it is difficult in practice to locate a desired service. Although a find_service operation to find a service is available in the Universal Description, Discovery, and Integration (UDDI) interface of the conventional service registry system 100, the find_service operation is impractically difficult to use for the programmer while developing the software system. This seriously hampers the deployment of SOAs.

BRIEF SUMMARY

A method of searching a service registry system including a plurality of services identified by respective service names, wherein at least some of said service names are associated with a set of client identifiers, includes receiving a search request, said request including a service name and a further set of client identifiers, searching, using a processor, the service registry system for a match between the requested service name and a service name of one of said services in the service registry system, and, in the absence of such a match, searching, using the processor, the service registry system for services that have an association with at least some of the client identifiers in said further set. The method further includes returning a search result.

A system includes a processor programmed to initiate executable operations. The executable operations include receiving a search request, said request including a service name and a further set of client identifiers, searching a service registry system for a match between the requested service name and a service name of one of a plurality of services within the service registry system, wherein each service of the plurality of services of the service registry system is identified by a respective service name, at least some of said service names are associated with a set of client identifiers, and, in the absence of a match, searching the service registry system for services that have an association with at least some of the client identifiers in said further set. The executable operations further include returning a search result.

A computer program product comprising a computer readable storage medium having program code stored thereon. The program code is executable by a processor to perform a method. The method includes receiving, using the processor, a search request, said request including a service name and a further set of client identifiers, and searching, using the processor, a service registry system for a match between the requested service name and a service name of one of a plurality of services within the service registry system. Each service of the plurality of services of the service registry system is identified by a respective service name, at least some of said service names are associated with a set of client identifiers. The method further includes, in the absence of a match, searching, using the processor, the service registry system for services that have an association with at least some of the client identifiers in said further set and returning, using the processor, a search result.

BRIEF DESCRIPTION OF THE SEVERAL VIEWS OF THE DRAWINGS

Embodiments of the invention are described in more detail and by way of non-limiting examples with reference to the accompanying drawings, wherein.

DETAILED DESCRIPTION

Figure 1:
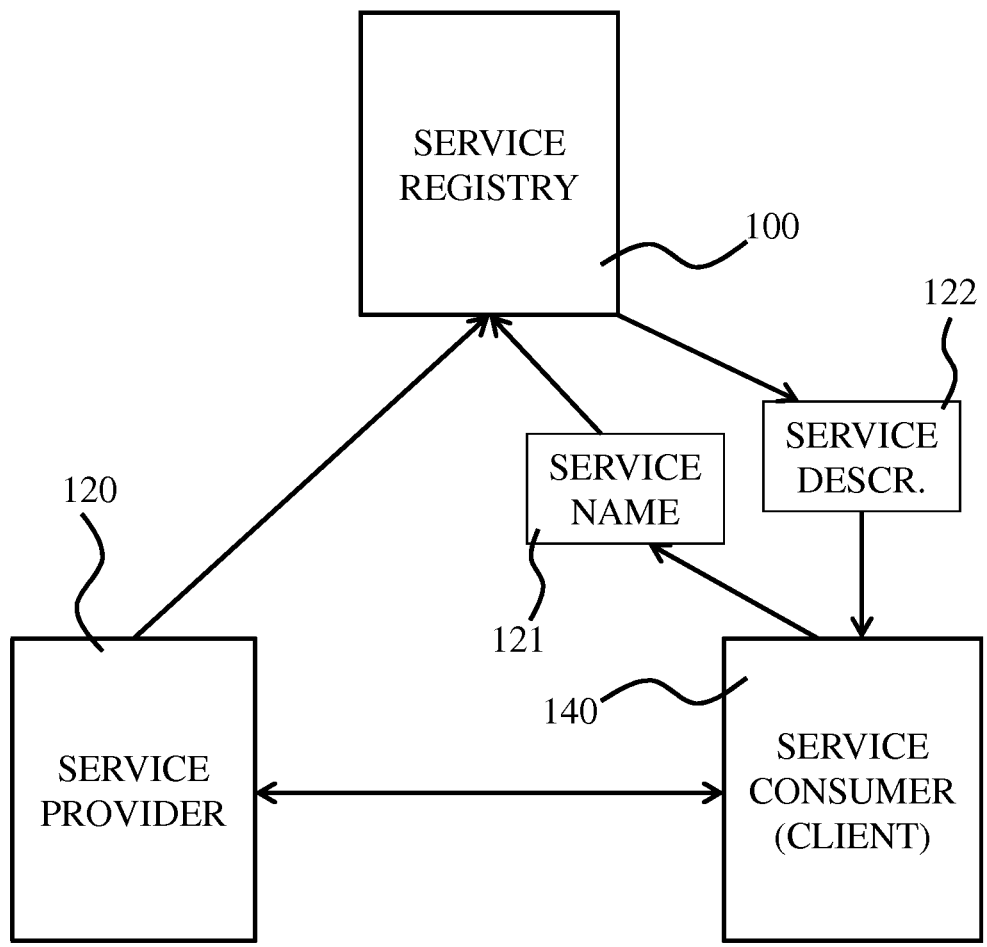
FIG. 1 schematically depicts a prior art SOA.

The present invention relates to a method of searching for a service in a service-oriented architecture. The present invention further relates to a computer program product facilitating the execution of such a method. The present invention yet further relates to a system for executing such a method.

Embodiments of the present invention seek to provide an improved method of searching a service registry system. Embodiments of the present invention further seek to provide a computer program product including computer program code for executing such a method. Embodiments of the present invention yet further seek to provide a system for executing such computer program code.

According to an aspect, there is provided a method of searching a service registry system comprising a plurality of services identified by respective service names, at least some of said service names being associated with a set of client identifiers, the method comprising receiving a search request, said request including a service name and a further set of client identifiers; searching the service registry system for a match between the requested service name and a service name of one of said services in the service registry system; and in the absence of such a match, searching the service registry system for services that have an association with at least some of the client identifiers in said further set; and returning a search result.

The present invention is based on the insight that by associating successfully matched service names in a service registry with identifiers characterizing the client for instance using terms that are transaction or other suitable keywords that allow the identification of the client's field of business, subsequent service searches in which a desired service cannot be identified by the name of the desired service can still yield successful results because of the association of previously matched services with the client identifiers present in the previously successful search. This significantly improves the chances of the successful identification of a relevant service in the service registry.

In an embodiment, said search result includes at least one service selected based on the strength of said association of the service with said client identifiers in said further set. This has the advantage that the risk of retrieving irrelevant services only is reduced. The association strength may be selected from the number of client identifiers that the service and the further set have in common; and/or the relevance of a client identifier that the service and the further set have in common.

In an embodiment, the step of searching the service registry system to find a match between the requested service name and a service name of one of said services in the service registry system further comprises searching for synonyms of the specified service name in the absence of an exact match of the specified service name in the service registry system. This further improves the likelihood of successfully retrieving a relevant service from the service registry.

In another embodiment, the step of searching the service registry system for services that have an association with at least some of the client identifiers in said further set further comprises searching for service names that are synonyms of the specified service name. This reduces the risk that irrelevant services are retrieved from the service registry.

The synonyms may be classified using client identifiers, in which case the method may further comprise selecting a synonym from a classification corresponding to at least one client identifier from said further set. This improves the relevance of the selected synonyms.

In a further embodiment, the service registry system comprises a thesaurus of client identifier synonyms, and wherein the step of searching the service registry system for services that have an association with at least some of the client identifiers in said further set comprises selecting a synonym of at least one client identifier from said thesaurus; and searching the service registry system for service names of services that have an association with the one or more selected synonyms. This yet further improves the likelihood of successfully retrieving a relevant service from the service registry.

Preferably, the method further comprises upon finding said match, associating the matching service in said system with said set of identifiers, as this improves the likelihood that future searches yield successful results as previously explained.

In an embodiment, said associating step comprises assigning statistical data relating to a correlation between the matching service and at least some of said identifiers to said matching service to improve the accuracy of the matching step based on overlapping client identifiers.

The further set of client identifiers may be present in the client search request in the form of metadata.

In an embodiment, at least some of the steps of the method of the present invention are performed by a proxy server.

According to another aspect, there is provided a method of compiling a message for use as the client search request in the aforementioned service registry searching method, the method comprising specifying a service name for said searching in said message; and specifying a set of identifiers identifying one or more characteristics of said client in said message. Such a message has an improved chance of achieving a successful search result when used in conjunction with the aforementioned service registry searching method for the reasons explained above.

Preferably, said identifiers are specified in accordance with an agreed convention to improve the likelihood of such a successful search result.

According to yet another aspect, there is provided a computer program product comprising a computer-readable storage medium having computer-readable program code, when executed on a computer, causing the computer to implement the steps of one or more embodiments of the methods of the present invention.

According to yet another aspect, there is provided a system comprising at least one processor and the computer program product of the present invention, wherein the at least one processor is adapted to execute said program code.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The various embodiments of the method of the present invention may be stored on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a computer may be a single device or a collection of distributed devices that are adapted to execute one or more embodiments of the methods of the present invention. For instance, a computer may be a personal computer (PC), a server or a collection of PCs and/or servers connected via a network such as a local area network, the Internet and so on to cooperatively execute at least one embodiment of the methods of the present invention.

In the present application, a service is defined as a software system designed to support interoperation and/or interactions between machines over a network. The web service has an interface described in a format that can be processed by a computer processor. Examples of such format may be, inter alia, Web Services Description Language (WSDL) in implementing the Universal Description, Discovery, and Integration (UDDI) interface, and so on. The service is provided in a business process model called a Service-Oriented Architecture (SOA). The SOA is defined as a business-driven software system that supports integration and linkage of business tasks or services, e.g., web services. The SOA supports customers by making the software system easily and cost-effectively adaptable to changing business needs of customers. To keep the flexibility of the SOA, each individual business process desired by customers should be loosely coupled to relevant business tasks or services that are implemented by the software system. Also, because of rapidly changing business needs, software modules of the SOA are often developed concurrently. Consequently, client modules are typically developed when the service definition is not known in a complete form.

In this specification, the term web service and the term service are used interchangeably. A service registry system supports a parallel development of client modules and service modules of an SOA software system, by providing loose coupling of service definitions provided in the software project and corresponding service descriptions that associate tasks that should be performed according to the service definition. The SOA software system comprises at least one service 120. Each service provided by the SOA software system is identified by a service name 121 in the service registry system 200 together with a corresponding service description 122.

The service registry system 200 is a software component in the SOA software system used to publish, discover and manage said at least one service. In an embodiment, the service registry system 200 is a central reference point in storing and managing metadata associated with said at least one service within the SOA of the SOA software system. In an alternative embodiment, the service registry system is a distributed collection of such reference points. Information described in metadata for a service may be, inter alia, what the service is, how the service is used, and how the service is interconnected with other components, and so on. The metadata for services fosters reuse of services assets and to govern services throughout the lifecycle of the Service-Oriented Architecture of the SOA software system. Examples of the service registry system may be, inter alia, WebSphere® Service Registry and Repository (WSRR) by IBM®, and so on. In this specification, the service description 122 refers to the metadata published and stored in the service registry system that describes a respective service 120 identified by the service name 121.

Figure 2A:
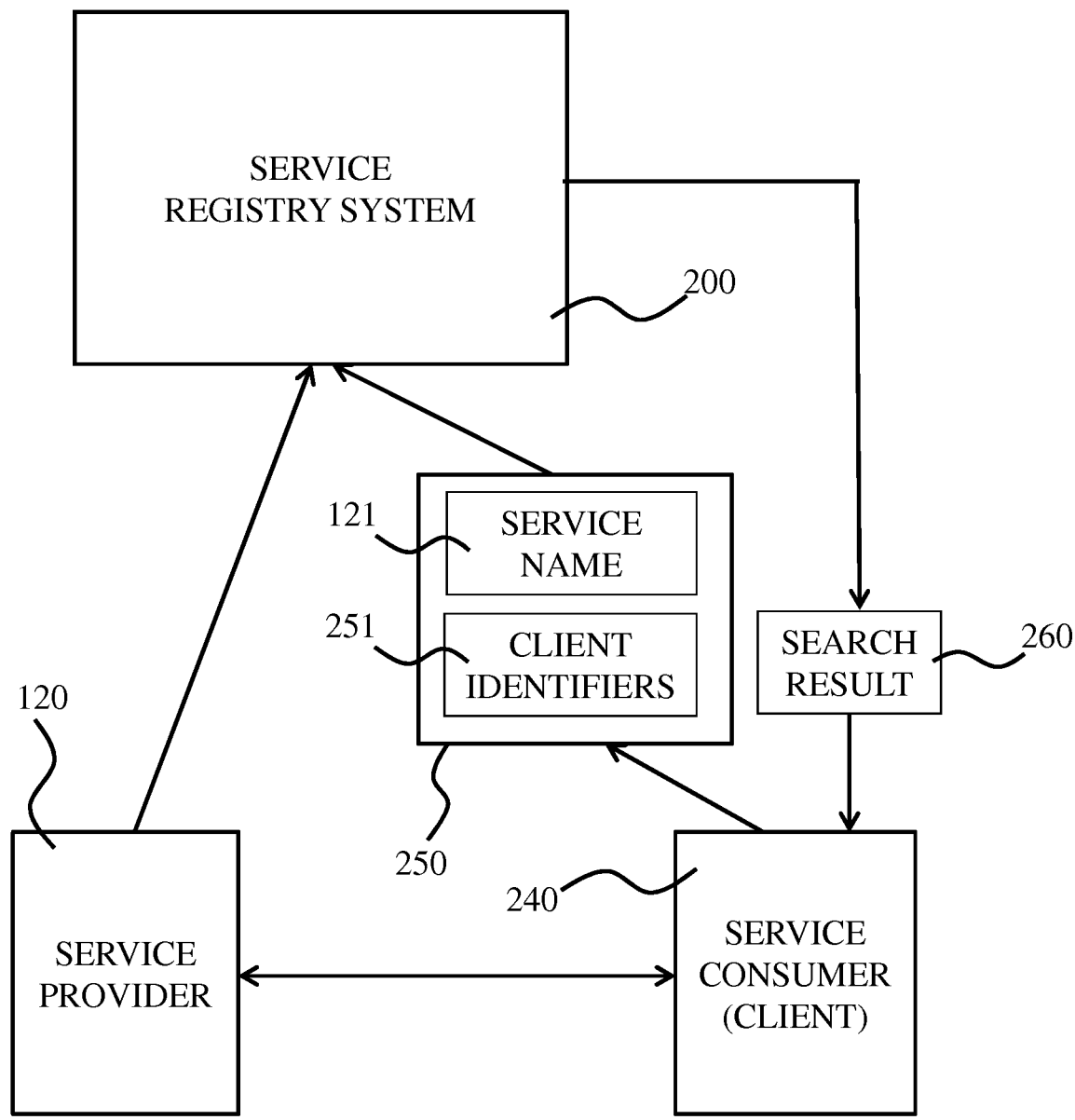
FIG. 2A schematically depicts an architecture in accordance with an embodiment of the present invention.
Figure 2B:
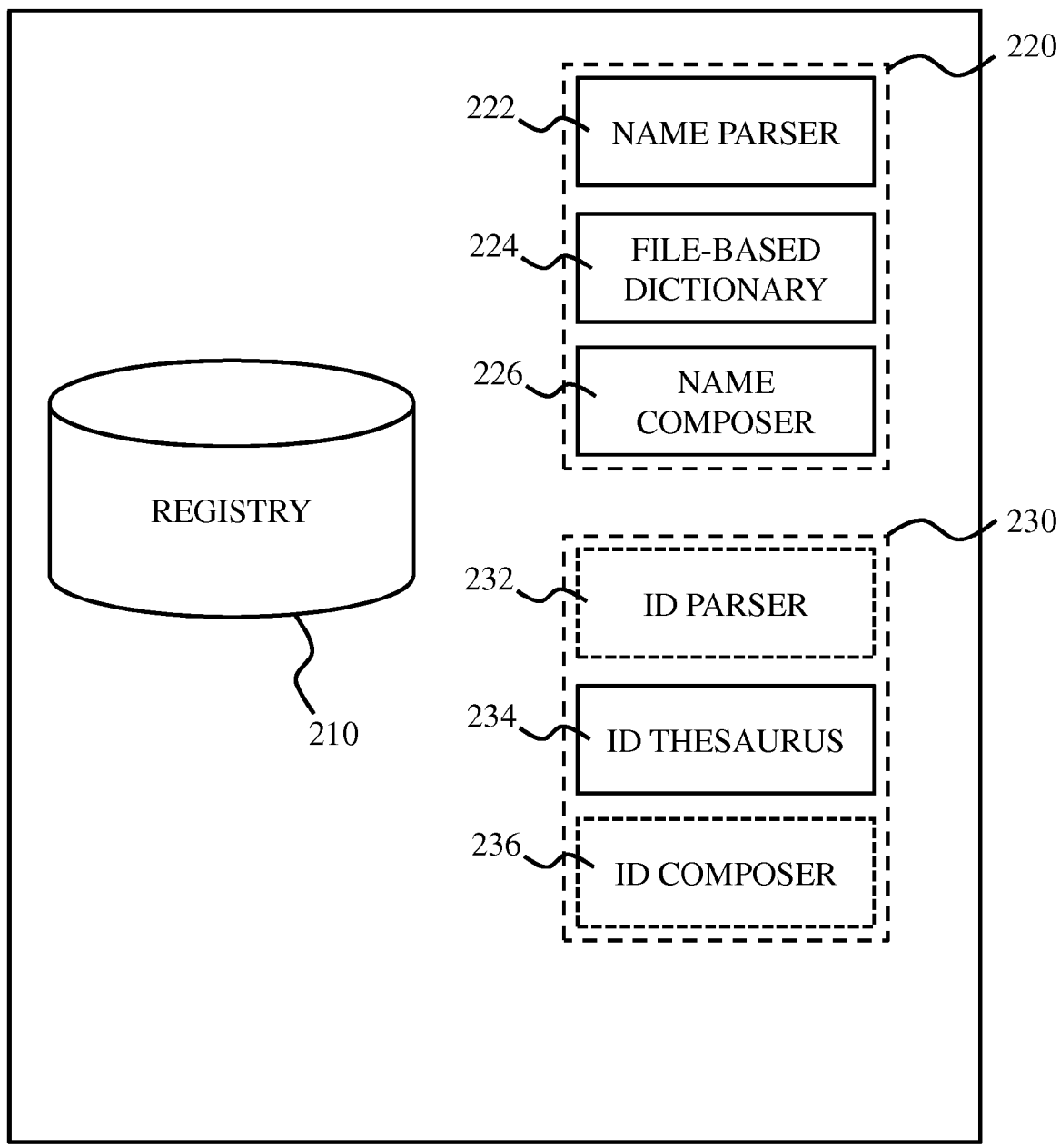
FIG. 2B schematically depicts an aspect of the system of FIG. 2A in more detail.

FIGS. 2A and 2B show an embodiment of a system architecture according to the present invention. A service registry system 200 is provided that comprises a service registry 210 in which references to services 120 are stored, e.g., the service names 121 and the service descriptions 122 of each service 120. The service registry 210 further stores client information, e.g., metadata, which has been associated with one or more of the service names 121 following a successful search request 250 including a target service name 121 and a set of client identifiers 251 from one or more clients 240.

In an embodiment, the client identifiers 251 contain descriptors that identify aspects of the business of the client, such that upon the location of a service 120 that matches the search request 230, e.g., because of an exact match between the target service name 231 and the name of the service 120, the registration of the service 120 in the service registry 210 is labelled with the client identifiers 251 to indicate that the thus identified service has a particular relevance to the business described by the client identifiers 232. For instance, for a client 240 in the travel industry, e.g., a travel agent, a set of useful identifiers 251 may include identifiers such as "Travel", "Tourism", "Hotel", "Flight", "Car" and so on, whereas for a client in the finance industry, a set of useful identifiers 251 may include identifiers such as "Banking", "Exchange", "Saving", "Shares", "Mortgage" and so on.

Figure 3:
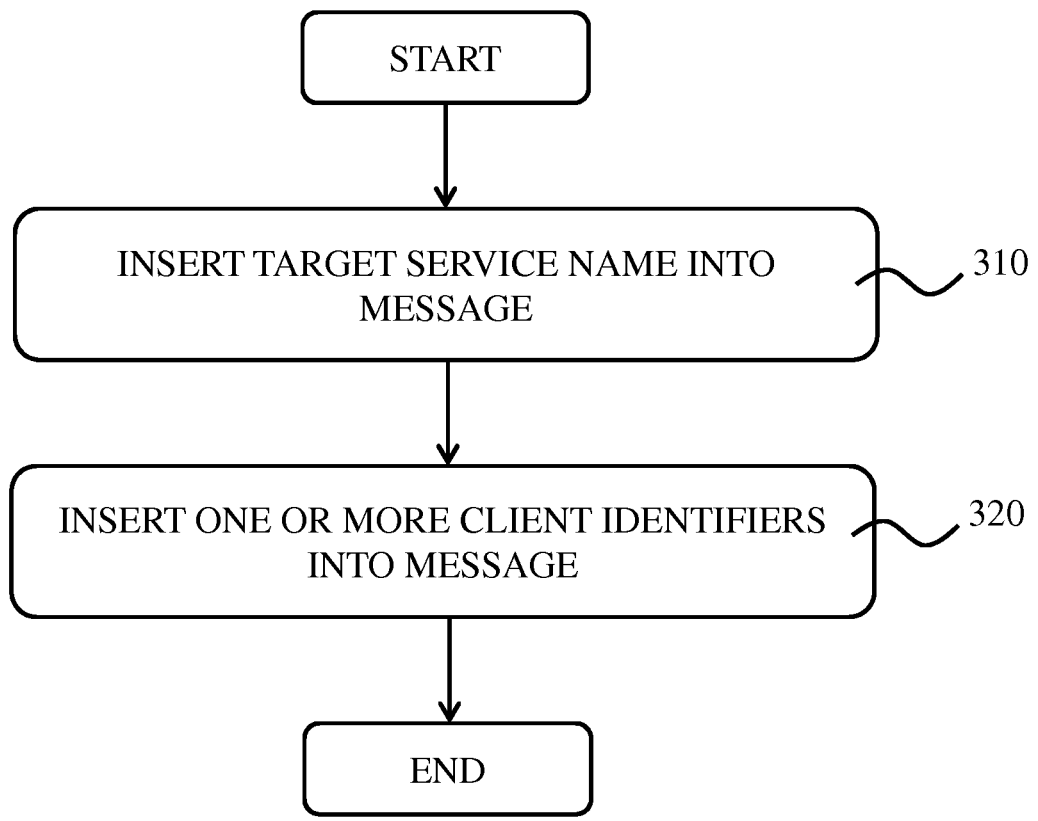
FIG. 3 depicts a flow chart of a method in accordance with an embodiment of the present invention.

The client 240 may compile the search instruction or message 250 by means of a method 300 as shown in FIG. 3; in a first step 310 the target service name may be added to the message 250 followed by the addition of a non-empty set of N client identifiers 251 I1, . . . , IN in step 320, N being a positive integer, after which the message is sent to one or more service registry systems 200. At least the set of identifiers are preferably added to the message 250 in the form of metadata. Any suitable form of metadata may be used. As previously explained, in an embodiment, the message 250 may take the form of a message compliant with an XML-based protocol such as SOAP or JSON, although it should be understood that any message protocol allowing the inclusion of metadata may be used.

The method 300 may be executed by the client 240. Alternatively, at least part of the message 250 may be created by a proxy server (not shown); for instance, the proxy server may be in charge of sending the message to the one or more service registry systems 200, and may in addition by responsible for adding the set of client identifiers 251 to the message 250 prior to sending the message 250 to the one or more service registry systems 200.

Figure 4A:
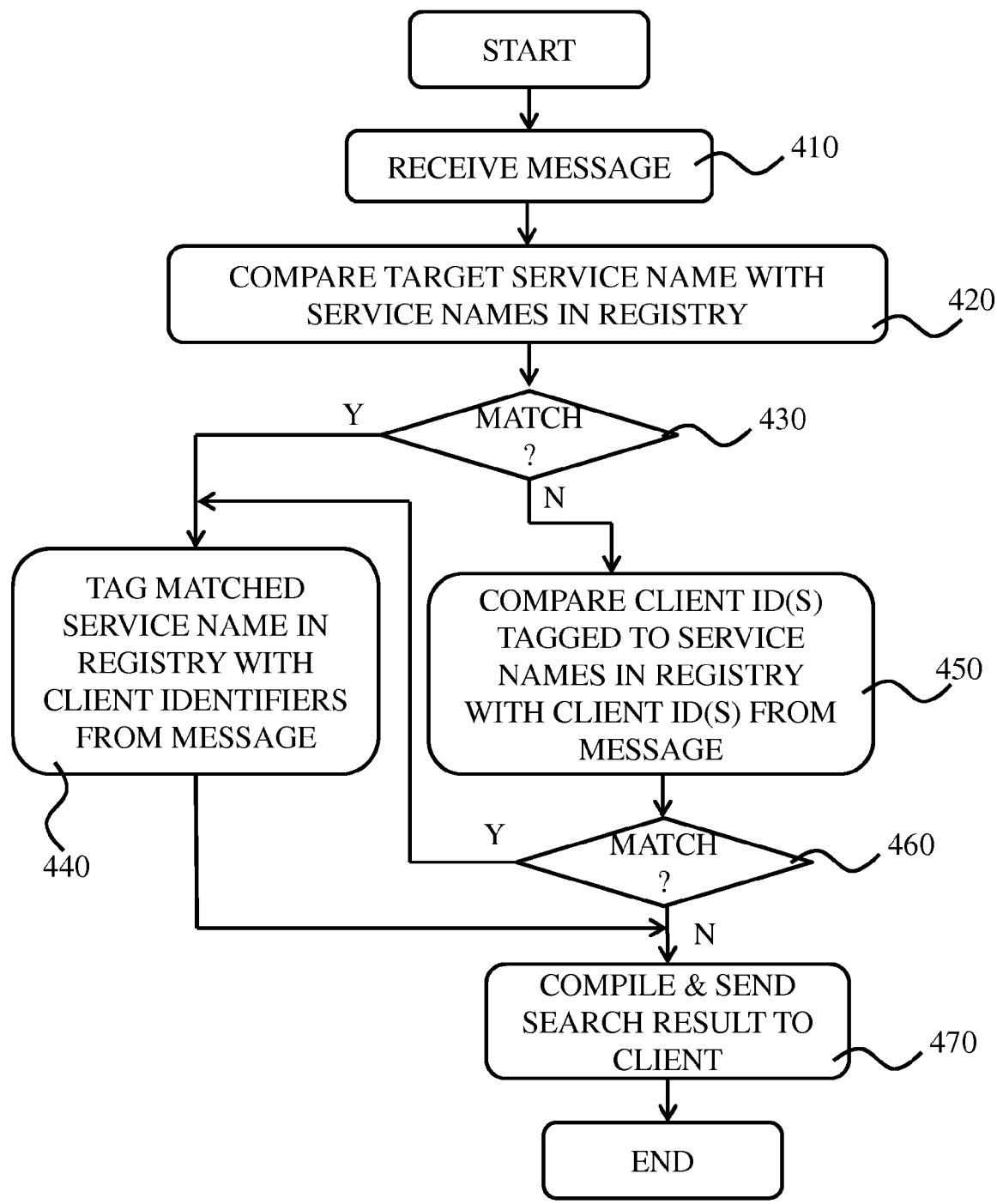
FIG. 4A depicts a flow chart of a method in accordance with an embodiment of the present invention.
Figure 4B:
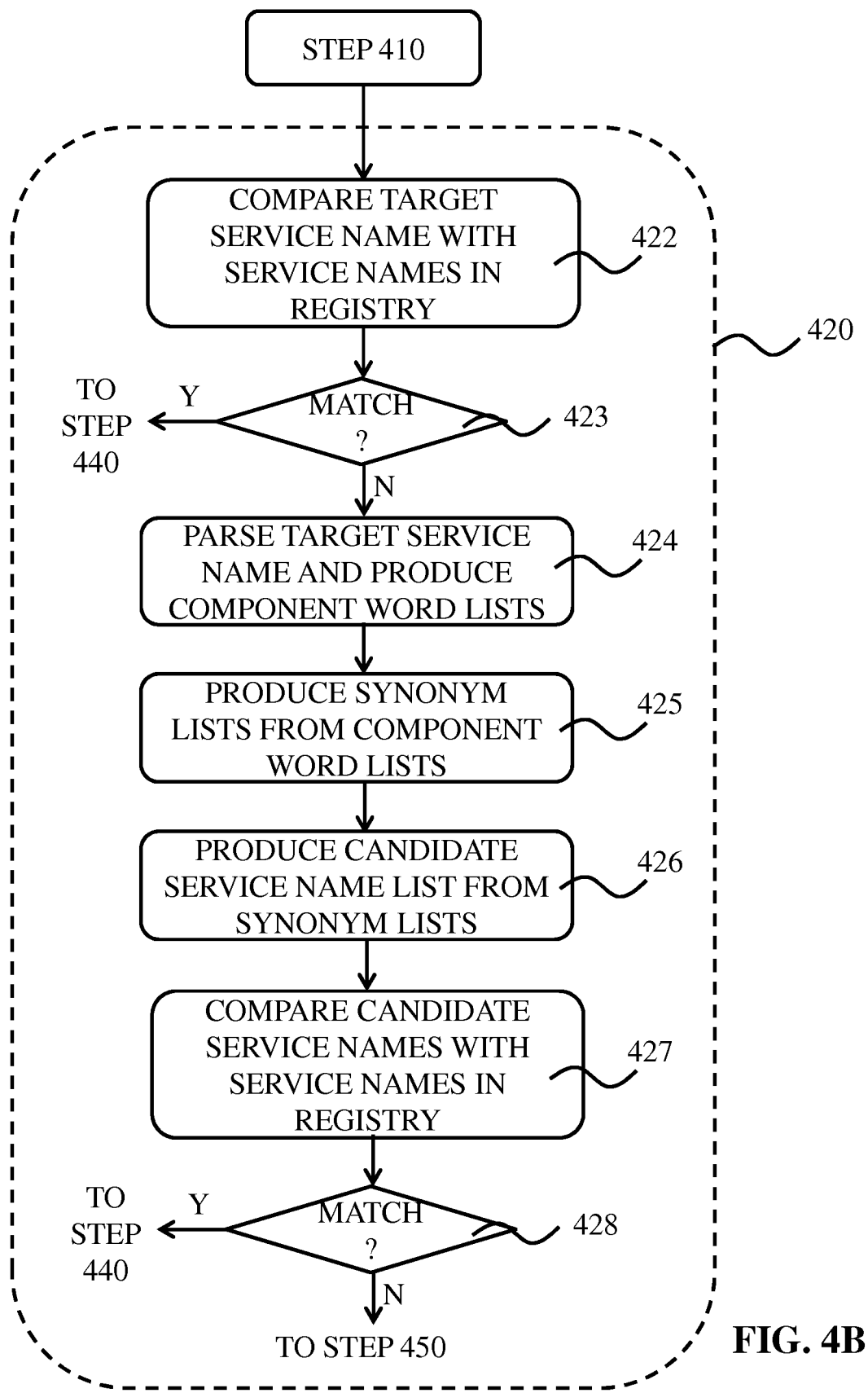
FIGS. 4B and 4C depict flow charts of non-limiting embodiments of various steps of the method shown in FIG. 4A in more detail.
Figure 4C:
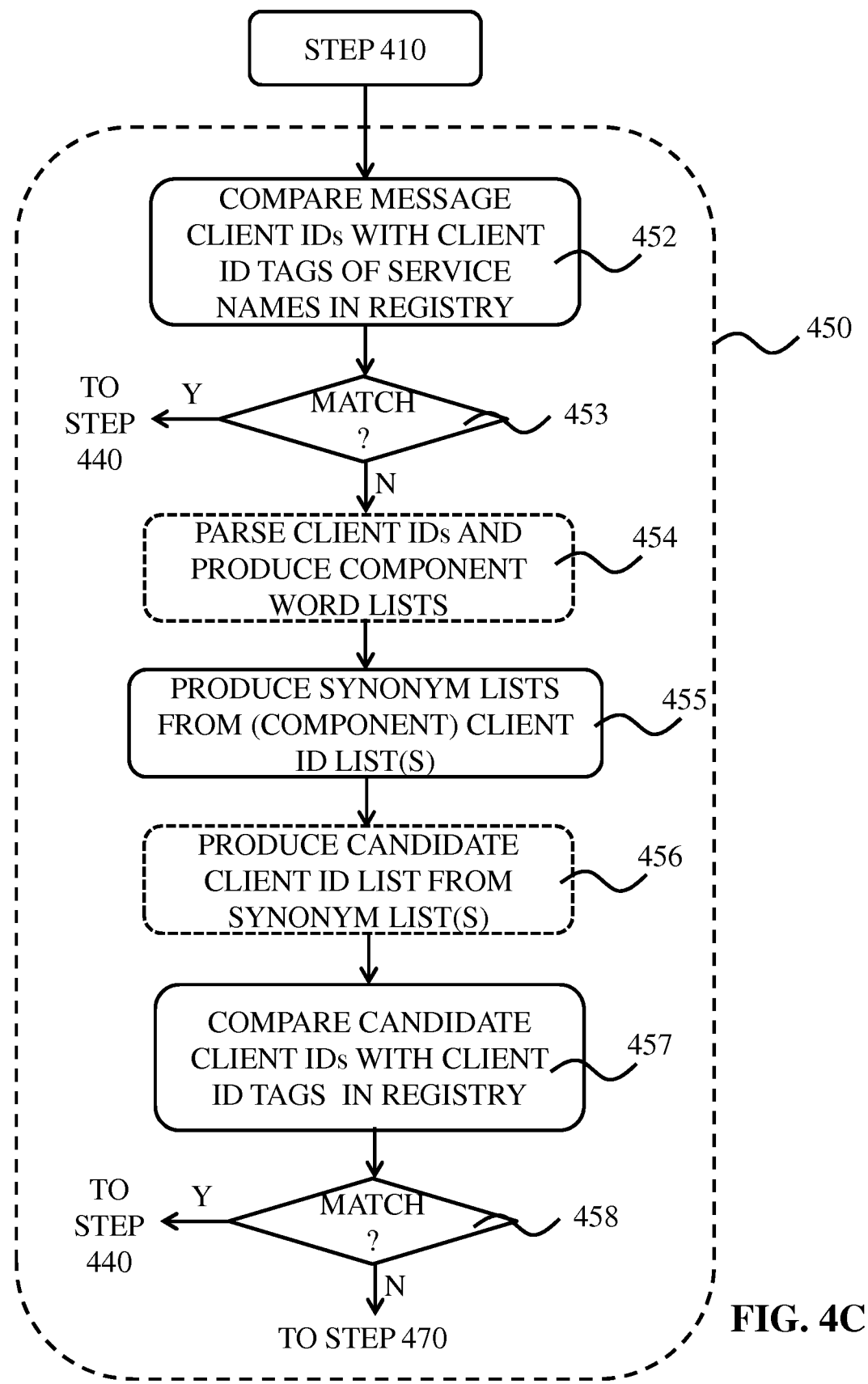

In an embodiment, the message 250 is processed by a service registry system 200 in accordance with one or more of the methods shown in FIG. 4A-C. In step 410, the message 250 is received by the service registry system 200, which extracts the target service name 121 from the message 250 and searches the registry 210 for a matching service name in step 420. In an embodiment, the matching step 420 may comprise the step 422 of finding an exact match, and in the absence of such an exact match as checked in step 423, determining one or more synonyms of the target service name 121 and search the registry 210 to find a match between the identified synonym of the target service name 121 and the name of one or more services 120 registered with the registry 210.

To this end, the service registry system 200 may comprise a synonym determination module 220, which itself may be a service, including a name parser module 222, a file-based dictionary or thesaurus 224 and a name composer module 226 for composing the one or more synonyms of the target service name 121. Such a synonym determination module has been explained in detail in US 2010/0017405 A1.

For instance, the name parser 222 receives the service name 121 from the registry 210 and parses the received service name 121 in step 424 in case no exact match between the target service name 121 in the message 250 and the names of the services 120 registered with registry 210 was found in step 422. The name parser 222 produces a component word list comprising all words appearing in the service name 121. For example, upon receiving the service name 121 "getCarPrice", the name parser 222 produces a component word list {"get", "car", "price"}.

The file-based dictionary 224 or thesaurus receives the component word list from the name parser 222 and produces a synonym list in step 425 for each word in the component word list produced by the name parser 222. In the same embodiment, the file-based dictionary 224 produces synonym lists for each of the component words, such as a synonym list {"get", "fetch", "obtain"} for a component word "get" of the component word list above. In an embodiment, the file-based dictionary 224 or thesaurus selects synonyms based on one or more of the client identifiers 251 of the message 250 such that only synonyms that are relevant to the business of the client are selected. To this end, the file-based dictionary 224 or thesaurus may comprise different categories of synonyms, which each category being identified by one or more client identifiers. In case multiple categories are identified, the category containing the most client identifiers 251 from a single message 250 may be selected.

The name composer 226 receives all synonym lists and produces a candidate service name list in step 426 by ordering and concatenating synonyms in synonym lists. For instance, in the above example, the name composer 226 produces a candidate service name list {"getCarPrice", "getVehiclePrice", "getAutomobilePrice", "obtainCarPrice", "obtainVehiclePrice", "obtainAutomobilePrice", "fetchCarPrice", "fetchVehiclePrice" "fetchAutomobilePrice"} from three synonym lists {"get", "fetch", "obtain"}, {"car", "vehicle", "automobile"}, and {"price"}. At least some of the candidate service names are subsequently compared with the service names in the registry 210 in step 427.

In an embodiment, the service names in the registry 210 are compared to each synonym service name in the candidate service name list, and a search result is produced based on the comparison results of all members of the candidate service name list against the contents of the registry 210. Alternatively, the comparison of synonym service names from the candidate service name list against service names in the registry 210 is terminated once a predefined number of hits has been reached.

Upon completion of step 427 it is determined in step 428 if one or more of the candidate service names matched a service name in the registry 210. In case of the existence such a match, the method proceeds to step 440 which will be explained in further detail below. In the absence of a match in step 428, the method proceeds to step 450, which will also be explained in further detail below.

At this point it is noted that the extended comparison method in FIG. 4B has been shown by way of non-limiting example only. It is equally feasible to only include steps 422 and 423 in step 420 in FIG. 4A, i.e., to omit the synonym-based comparison of the target service name 121 with the service names in the registry 210 and to only search for exact matches with the target service name 121 from the message 250. In this case, the service registry system 200 shown in FIG. 2B may not include the synonym determination module 220.

Alternatively, it is equally feasible to progress from step 422 to step 424 regardless of whether a match was found in step 423, i.e., to omit step 423. This is for instance advantageous if the client is interested in receiving multiple candidate service names 121 and/or service descriptions 122 that are available in the registry 210, such that the client can select the most appropriate service, which may not necessarily be the service having the name 121 as specified in the message 250. It is furthermore noted that the synonym generating module 220 may be implemented in any suitable manner, and is not necessarily limited to the embodiment shown in FIG. 2B and its operation as explained with the aid of FIG. 4B.

In an embodiment, in case the comparison 420 of the target service name 121 with the names of the services in the registry 210 yielded one or more positive results, the method may proceed to step 440 as shown in FIG. 4A. In this step, the services 120 listed in the service registry 210 having names that were found matching the exact target service name 121 in the message 250 or a synonym thereof are associated, e.g., tagged, with the client identifiers 251 in the message 250. The purpose of the introduction of such associations or tags is that it indicates that the tagged service 120 is relevant to the business described by the client identifiers 251. Such associations or tags can help subsequent client requests for locating services 120 in the registry 210 to identify relevant services 120 for instance in case step 420 does not result in a match between the target service name 121 in the subsequent client request, as will be explained in more detail below.

The tags to the services 120 listed in the registry 210 may take any suitable form, and may be stored in any suitable location of the registry 210, e.g., together with the information concerning the services 120 or in a separate location, e.g., a separate table or data base. The tags may for instance comprise statistical data concerning the correlation between the client identifier 251 and the service 120. To this end, a proxy may keep track of the total number of times T a particular service has been retrieved during the execution of step 420, and the total number of times t the client identifier formed part of the message 250 causing the comparing step 420 to return the particular service 120, in which case the correlation C may be expressed as a relation including the term t/T, e.g. $C \sim t/T$, in which $t \leq T$, with t and T both positive integers. This allows for a quantitative assessment of the relevance of a particular service 120 to a particular client identifier 251.

Another useful metric may be to keep track of the total number M of messages 250 that include a client identifier 251 that has been tagged to a service 120, and determine the number of times m that the tagged service 120 is retrieved in the search triggered by the message 250, in which case the correlation may be expressed as C~m/M, in which m≤M, with m and M both positive integers. At least some of these correlation metrics may be combined, or other suitable correlation metrics that will be apparent to the skilled person may equally be applied instead.

After the matched services 120 have been tagged in step 440, the method in FIG. 4A may proceed to step 470 in which the search results 260, e.g., a list of service names 121 and/or service descriptions 122 that were considered to match the search request message 250, are compiled and returned to the client 240 or the proxy server handling the client request.

At this point, it is noted that in an alternative embodiment, step 440 may be omitted from the method of the present invention at least for some occasions when a match is found between a target service name 121 in the message 250 with the names of the services 120 listed in the registry 210, in which case the method may proceed directly to step 470. Step 440 may for instance be omitted if it is decided that a sufficient number of tagging steps 440 have previously been performed such that the tag information has reached a sufficient level of (statistical) accuracy, or when the matched service 120 has only a small number of client identifiers in common with the total number of client identifiers 251 in the message 250, thereby indicating that the relevance of the service 120 to the business of the client 240 may be limited.

Now, returning to step 430 in FIG. 4A, in case the comparison step 420 of the target service name 121 in the message 250 with the names of the services 120 listed in the registry 210 did not yield a positive result, the method may proceed to step 450 in which the client identifiers 251 in the message 250 are used to find as search criteria for finding potentially matching services 120 in the registry 210. To this end, the client identifiers 251 of the message 250 are compared with the client identifiers associated with the services 120, i.e., the tagged services 120 that are listed in the registry 210.

In a first embodiment, every service 120 that has an association with at least one of the client identifiers 251 specified in the message 250 is considered a matching service. However, this may be impractical in case the service registry 210 comprises a large number of listed services 120, as this can result in the client 240 receiving a long list of names 121 and/or descriptions 122 of potentially matching services 120 in the search results 260, which may make it difficult for the client to select the appropriate service 120 from the search results 260.

In an alternative embodiment, only services 120 are considered matching services if the previously mentioned correlation C of the client identifier tagged to a listed service 120 exceeds a predefined threshold, such that only services 120 are included in the search results 260 that can be expected to be relevant to the business of the client 240. In yet another embodiment, these two embodiments may be combined, i.e., the relevance of a listed service 120 having a client identifier 251 in common with a message 250 is only considered if the total number of matched services exceeds a defined threshold.

In yet another embodiment, a listed service 120 having a client identifier 251 in common with a message 250 is only considered relevant if the set of client identifiers associated with the listed service 120 has a minimum overlap with the further set of client identifiers 251 of the message 250, e.g., for N client identifiers 251 in the message 250, at least n client identifiers should be shared with the listed service 120, in which n≤N, with n and N both positive integers. In a further variation, such a minimum overlap may only be considered if the total number of listed services 120 that have at least one client identifier in common exceeds a defined threshold. The value of the threshold may be determined in any suitable manner, for instance by using empirical data. Also, the characteristics of the candidate service 120 may be taken into consideration when determining if the candidate service 120 is considered relevant to the client request message 250. Other embodiments in which a service 120 listed in the registry 210 that has at least one client identifier in common with the message 250 is considered a matching service will be apparent to the skilled person.

After one or more matching services 120 have been found in step 450 the method may progress to step 440 to tag the matched services 120 accordingly or to update the statistical information associated with the matched services 120 as previously explained. Alternatively, the method may proceed directly to step 470 in which the relevant information about the matching services 120 is included in the result message 260 to the client 240. In case no service 120 has a client identifier in common with the message 250 as determined in step 460, the method may proceed directly to step 470, in which case a null result is returned to the client 240.

In an embodiment, the step 450 of comparing client identifiers tagged to listed services 120 in the service registry with client identifiers from the message 250 is limited to finding exact matches between the tagged identifiers and the message identifiers only.

However, in an alternative embodiment, which is shown in FIG. 4C, a synonym-based client identifier matching step may be performed, if no exact match between a client identifier 251 in the message 250 and a client identifier associated with one of the services 120 listed in the service registry is found in step 452, as determined in check step 453.

In this embodiment, the service registry system shown in FIG. 2B may optionally comprise a client ID synonym determination module 230, which itself may be implemented as one or more services. The client ID synonym determination module 230 may comprise a client identifier parser 232, which parses the received client identifier 251 in step 454 in the same manner as parser 232. The client identifier parser 232 produces a component word list comprising all words appearing in each client identifier 251. However, the client identifier parser 232 and method step 454 may be omitted if the client identifiers 251 are typically single words, in which case the decomposition step is redundant.

A file-based dictionary 234 or thesaurus receives the component word list from the client identifier parser 232 or the single word client identifiers 251 directly from the message 250 and produces a synonym list in step 455 for each word in the component word list or produced by the client identifier parser 232 or for the single word client identifiers 251 received from the message 250 if no client identifier parser 232 is present. The file-based dictionary or thesaurus 234 produces synonym lists for each of the component words or client identifiers 251, in the same manner as explained for dictionary 224. In an embodiment, synonyms are classified in the file-based dictionary or thesaurus 234 in business categories, in which case synonyms may be selected from the relevant business category only.

In optional step 456, an optional client identifier composer 236 receives all synonym lists and produces a candidate client identifier list in step 456 by ordering and concatenating synonyms in concatenated synonym lists. Step 456 and client identifier composer 236 may be omitted in case the client identifiers 251 in the message 250 are typically single word identifiers as previously explained.

The (concatenated) client identifier synonym(s) are subsequently compared in step 457 with the client identifiers tagged to the services 120 listed in the registry 210 in the same manner as already explained in further detail for the exact matching step 450. In case of a match (of sufficient relevance) as determined in step 458, the method may proceed to step 440 or alternatively to step 470 as previously explained. If no match is found, the method may proceed to step 470 to return a null result to in the result message 260 to the client 240. In an embodiment, step 450 may be terminated as soon as a matching service 120 has been identified, or when a number of matching services 120 has been identified. In an embodiment, the search result 260 may include information concerning all matching services 120 or, alternatively, only a single matching service 120, e.g. the most relevant service 120.

It is noted that the present invention is considered to be particularly advantageous if business sectors can agree on a convention for their client identifiers 251, as this will improve the likelihood that a relevant service 120 can be identified in the registry 210 when using client identifiers 251 to identify such a service.

In summary, embodiments of the present invention enable a client to find services for which no service name match can be found in a service registry system 200 by including client identifiers or descriptors 251 that describe aspects, e.g., transactions or subjects, of the business of the client.

For instance, when returning to the aforementioned example of the client in the travel sector, this client may have successfully found a service with the service name Book_Flights, which service was subsequently associated with the client identifiers "Travel", "Tourism", "Hotel", "Flight", "Car" in step 440 as previously explained.

A next client from the same sector may send a search message 250 to the service registry system 200, in which the target service name 121 is specified as Book_Airline_Seats together with client identifiers 251 "Travel", "Accommodation", "Flight" and "Transportation". This target service name may not yield a successful match with the available service Book_Flights. However, since this service has been associated with the client identifiers "Travel", "Tourism", "Hotel", "Flight", "Car", the overlap between these associated client identifiers and the client identifiers "Travel", "Accommodation", "Flight" and "Transportation" in the subsequent client search request 250 nevertheless enables the query to match the service Book_Flights to this request in step 450 of the method of the present invention.

It is noted that the message 250 in the embodiments of the present invention has been described as containing a single target service name 121. It should however be understood that it is equally feasible that the message 250 comprises a list of target service names 121 in addition to the set or list of client identifiers 251, with the client identifiers 251 being applicable to all target service names 121 in the list.

The various embodiments of the methods of the present invention may be implemented in any suitable manner. For instance, embodiments of the method of the present invention may be made available as a computer program product comprising a computer-readable storage medium, wherein the various steps of the method are stored on the computer-readable storage medium in the form of computer-readable program code that when executed on a suitably adapted computer, will cause the computer to execute the steps of such a method.

Figure 5:
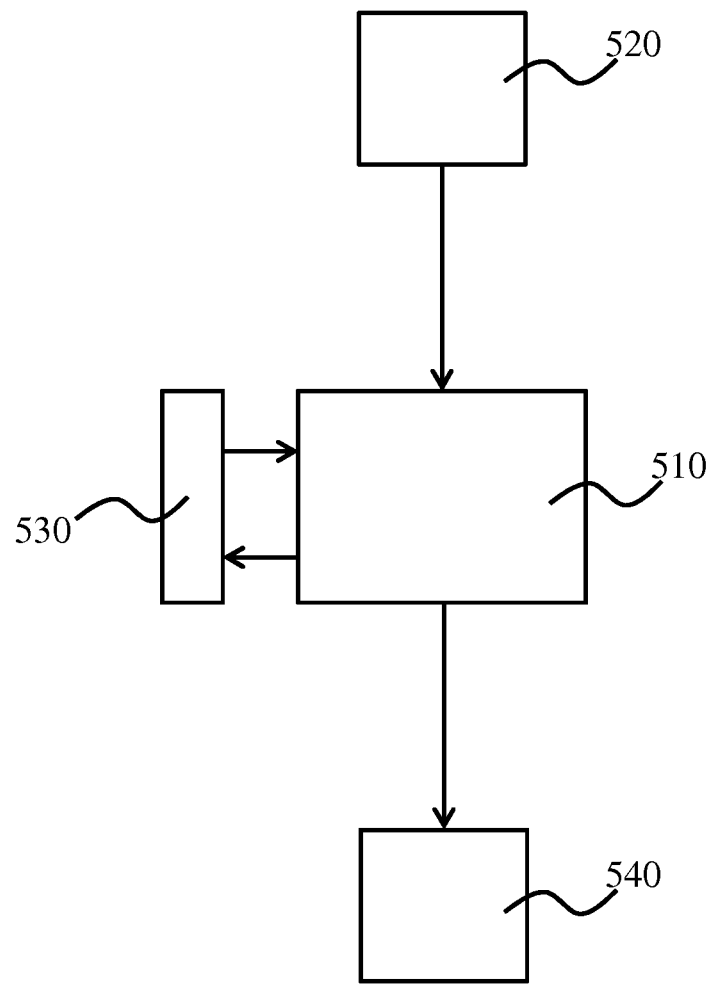
FIG. 5 schematically depicts a system in accordance with an embodiment of the present invention.

A non-limiting example of a suitable hardware architecture is shown in FIG. 5. A computer system 500 comprises one or more processors 510 adapted to execute the computer program code stored on the aforementioned computer program product. An input device 520, a memory 530, which may be a distributed memory and an output device 540 are all communicatively coupled to the one or more processors 510.

The input device 520 may for instance be a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, and so on.

The output device 540 may for instance be a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), and so on.

The memory 530 may for instance be a cache, a dynamic random access memory (DRAM), a read-only memory (ROM), a hard disk, a floppy disk, a magnetic tape, an optical storage medium such as a compact disc (CD) or a digital versatile disc (DVD), and so on. The memory 530 typically stores the computer program code defining the method steps of one or more of the embodiments of present invention for execution by the one or more processors 510.

In an embodiment, the system 500 may be adapted to act as a client application 240, in which case the input device 510 may be used to provide the one or more processors 510 with the target service name 121. The memory 530 may contain the client identifiers 251 and the program instructions to generate the message 250. The one or more processors 510 are adapted to execute these program instructions and to generate a message 250 including the target service name 121 received from the input device 520 and the client identifiers 251 retrieved from the memory 530. The one or more processors 510 are adapted to forward the generated message 250 to the output device 540, which is adapted to send the message 250 to a service registry system 200. Either the output device 540 or the input device 520 may be adapted to receive the result message 260 and pass this onto the one or more processors 510, which may be adapted to display the result message 260 on a further output device (not shown), e.g. a display.

In another embodiment, the system 500 may be adapted to act as a proxy for searching the service registry system 200. In this embodiment, the input device 520 may be adapted to receive the client identifier 251 or the message 250 from the client application 240 and the output device 540 may be adapted to send the result message 260 to the client application 240. The memory 530 may include computer program code for searching the registry 210 in accordance with at least one embodiment of the methods of the present invention, with the one or more processors 510 being adapted to execute this program code and compile message 250 and/or the result message 260 for the client application 240. In an embodiment, the memory 230 further comprises the client identifiers 251 of the client application 240.

In yet another embodiment, the system 500 may be adapted to act as a service registry system 200. In this embodiment, the input device 520 may be adapted to receive the message 250 from the client application 240 or its proxy and the output device 540 may be adapted to send the result message 260 to the client application 240 or its proxy. The memory 530 may include computer program code for searching the registry 210 in accordance with at least one embodiment of the methods of the present invention. The memory 530 may further comprise the registry 210, with the one or more processors 510 being adapted to execute this program code and compile the result message 260 for the client application 240. The memory 530 may further comprise computer program code for implementing the optional synonym determination modules 220 and/or 230, as will be apparent to the skilled person.

While particular embodiments of the present invention have been described herein for purposes of illustration, many modifications and changes will become apparent to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of searching a service registry system including a plurality of services identified by respective service names, at least some of said service names being associated with a set of client identifiers, the method comprising:
- receiving a search request, said request including a service name and a further set of client identifiers;
- first searching, using a processor, the service registry system for a match between the requested service name and a service name of one of said services in the service registry system, wherein the first searching includes, based upon the match not being found, additional searching for synonyms of the specified service, wherein said synonyms are classified using client identifiers, and a synonyms are classified using client identifiers, and a synonym from a classification corresponding to at least one client identifier from said further set is selected;
- second searching, based upon the match not being found, the service registry system for services that have an association with at least some of the client identifiers in said further set; and
- returning a search result from the second search, wherein each client identifier within the set of client identifiers and the further set of client identifiers identifies an aspect of a business of a particular client; and wherein an exact match between the requested service name and a service name in the registry causes the service name in the registry to be labeled with the further set of client identifiers.

2. The method of claim 1, wherein
said search result includes at least one service selected based on a strength of said association of the service with said client identifiers in said further set.

3. The method of claim 2, wherein
the association strength is based upon a number of client identifiers that the service and the further set have in common.

4. The method of claim 1, wherein
the second searching includes searching for service names that are synonyms of the specified service name.

5. The method of claim 1, wherein
the service registry system comprises a thesaurus of client identifier synonyms, and
the second searching includes:
- selecting a synonym of at least one client identifier from said thesaurus; and
- searching the service registry system for service names of services that have an association with the one or more selected synonyms.

6. The method of claim 1, further comprising
upon finding said match, associating the matching service in said system with said set of client identifiers.

7. The method of claim 6, wherein
said associating includes assigning statistical data relating to a correlation between the matching service and at least some of said client identifiers to said matching service.

8. The method of claim 1, wherein
the further set of client identifiers is present in the client search request as metadata.

9. The method of claim 1, wherein
at least one of the operations is performed by a proxy server.

10. A computer-hardware system configured to search a service registry system including a plurality of services identified by respective service names, at least some of said service names being associated with a set of client identifiers, comprising:
- a hardware processor programmed to initiate the following executable operations;
- receiving a search request, said request including a service name and a further set of client identifiers;
- first searching the service registry system for a match between the requested service name and a service name of one of the plurality of services within the service registry system, wherein the first searching includes, based upon the match not being found, additional searching for synonyms of the specified service, wherein said synonyms are classified using client identifiers, and a synonyms are classified using client identifies, and a synonym from a classification corresponding to at least one client identifier from said further set is selected;
- second searching, based upon the match not being found, the service registry system for services that have an association with at least some of the client identifiers in said further set; and
- returning a search result from the second search, wherein each client identifier within the set of client identifiers and the further set of client identifiers identifies an aspect of a business of a particular client; and wherein an exact match between the requested service name and a service name in the registry causes the service name in the registry to be labeled with the further set of client identifiers.

11. The system of claim 10, wherein
said search result includes at least one service selected based on a strength of said association of the service with said client identifiers in said further set.

12. The system of claim 11, wherein the association strength is based upon a number of client identifiers that the service and the further set have in common.

13. The system of claim 10, wherein
the second searching includes searching for service names that are synonyms of the specified service name.

14. The system of claim 10, wherein
the service registry system comprises a thesaurus of client identifier synonyms, and
the second searching includes:
- selecting a synonym of at least one client identifier from said thesaurus; and
- searching the service registry system for service names of services that have an association with the one or more selected synonyms.

15. The system of claim 10, wherein
the hardware processor is part of a proxy server.

16. A computer program product, comprising
a hardware storage device having program code stored thereon,
the program code, which when executed by a computer hardware system, causes the computer hardware system to perform;
- receiving a search request, said request including a service name and a further set of client identifiers;
- searching a service registry system for a match between the requested service name and a service name of one of a plurality of services within the service registry system; wherein each service of the plurality of services of the service registry system is identified by a respective service name, at least some of said service names are associated with a set of client identifiers, wherein the first searching includes, based upon the match not being found, additional searching for synonyms of the specified service, wherein said synonyms are classified using client identifiers, and a synonyms are classified using client identifiers, and a synonym from a classification corresponding to at least one client identifier from said further set is selected;

second searching, based upon the match not being found, the service registry system for services that have an association with at least some of the client identifiers in said further set; and returning a result from the second search, wherein each client identifier within the set of client identifiers and the further set of client identifiers identifies an aspect of a business of a particular client; and wherein an exact match between the requested service name and a service name in the registry causes the service name in the registry to be labeled with the further set of client identifiers.

* * * * *